US 9,276,809 B2

(12) United States Patent
Colbert et al.

(10) Patent No.: US 9,276,809 B2
(45) Date of Patent: *Mar. 1, 2016

(54) COMBINING PROFILES BASED ON PRIORITIES (71) Applicant: VMware, Inc., Palo Alto, CA (US)

(72) Inventors: Osten Kit Colbert, Mountain View, CA (US); Moshe Zadka, San Mateo, CA (US); Vera Asodi, Tel-Aviv (IL)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/231,501

(22) Filed: Mar. 31, 2014

(65) Prior Publication Data

US 2014/0215195 A1 Jul. 31, 2014

Related U.S. Application Data (63) Continuation of application No. 13/110,808, filed on May 18, 2011, now Pat. No. 8,776,055.

(51) Int. Cl.
G06F 9/46 (2006.01)
G06F 15/173 (2006.01)
H04L 12/24 (2006.01)
G06F 9/50 (2006.01)
G06F 9/455 (2006.01)
G06F 9/445 (2006.01)

(52) U.S. Cl.
CPC ............ *H04L 41/08* (2013.01); *G06F 9/44552* (2013.01); *G06F 9/45558* (2013.01); *G06F 9/50* (2013.01); *G06F 9/5061* (2013.01); *G06F 9/5072* (2013.01); *G06F 9/5077* (2013.01); *H04L 41/0803* (2013.01); *H04L 41/0876* (2013.01); *H04L 41/0893* (2013.01); *G06F 2009/45591* (2013.01)

(58) Field of Classification Search
None
See application file for complete search history.

(56) References Cited

U.S. PATENT DOCUMENTS

| | | |
|---|---|---|
| 2002/0087611 A1 | 7/2002 | Tanaka et al. |
| 2002/0194317 A1 | 12/2002 | Kanada et al. |
| 2006/0294238 A1 | 12/2006 | Naik et al. |
| 2007/0027985 A1 | 2/2007 | Ramany et al. |
| 2007/0033578 A1 | 2/2007 | Arnold et al. |
| 2007/0174429 A1 | 7/2007 | Mazzaferri et al. |
| 2007/0245348 A1 | 10/2007 | Araujo, Jr. et al. |
| 2008/0082977 A1 | 4/2008 | Araujo, Jr. et al. |
| 2008/0134178 A1 | 6/2008 | Fitzgerald et al. |
| 2008/0240384 A1 | 10/2008 | Suryanarayana et al. |
| 2008/0295094 A1 | 11/2008 | Korupolu et al. |
| 2009/0328225 A1 | 12/2009 | Chambers et al. |
| 2010/0125477 A1 | 5/2010 | Mousseau et al. |

(Continued)

OTHER PUBLICATIONS

Lie et al.; "CSS3 module: Cascading and inheritance", retrieved from http://www.w3.org/TR/2005/WD-css3-cascase-20051215; 11 pgs.; 2005.

(Continued)

*Primary Examiner* — Charles Swift (57) ABSTRACT

Combining profiles based on priorities associated therewith to create an effective profile are provided. A plurality of profiles defining one or more rules that are applicable to a functional computing object are identified. A priority corresponding to each applicable profile is determined. The applicable profiles are combined by the computing device based on the corresponding priorities to create an effective profile that includes no conflicting rules.

20 Claims, 5 Drawing Sheets

(56) References Cited

U.S. PATENT DOCUMENTS

2010/0169507 A1    7/2010   Sahita et al.
2010/0281482 A1   11/2010   Pike et al.
2011/0131572 A1    6/2011   Elyashev et al.
2011/0307716 A1   12/2011   Diab
2012/0137291 A1    5/2012   Bacher et al.
2012/0166604 A1    6/2012   Fortier et al.

OTHER PUBLICATIONS

Microsoft Corp.; "End-to-End service Monitoring with Microsoft Sytsem Center Operations Manager 2007"; 9 pgs.; Dec. 18, 2007.

COMBINING PROFILES BASED ON PRIORITIES

CROSS-REFERENCE TO RELATED APPLICATION(S)

This application is a continuation application of and claims the benefit of U.S. patent application Ser. No. 13/110,808, filed May 18, 2011, which is incorporated herein by reference.

BACKGROUND

Functional computing objects, including hardware and/or software, generally include configuration options or rules that specify the behavior of the functional computing object. Such rules may be combined to create a profile, and the profile may be associated with a functional computing object, such that all the rules contained in the profile are applied to the functional computing object. Further, the profile may be associated with a plurality of functional computing objects to achieve identical or similar behavior from each of the functional computing objects.

SUMMARY

One or more embodiments described herein identify multiple profiles that are applicable to a functional computing object and that may define conflicting rules. A priority corresponding to each profile is determined, and the profiles are combined based on these priorities to create an effective profile that includes no conflicting rules.

DETAILED DESCRIPTION

Embodiments provided herein combine a plurality of profiles and resolve conflicts to generate an effective profile for a functional computing object such as a virtual machine instantiated on a computing device. The rules defined by different profiles may conflict, and such conflicts may be eliminated by combining the profiles based on corresponding priorities as described herein. Accordingly, an effective profile with no conflicting rules is generated and applied to the functional computing object.

The profile-based management system of the disclosure enables operators to manage large quantities of virtual machines and other computing devices while allowing customization of the profiles per-machine. For example, configurations, policies, permissions, automated remediations, and the like may be managed by the profiles. To change the settings for a particular machine, aspects of the disclosure enable the operator to adjust one or more of the rules within the profile for the particular machine without creating a profile specific to the particular machine. In this example, the operator of the machine maintains the benefit of management-at-scale while enabling customization per machine.

As used herein, the term "profile" refers to a collection of one or more rules that may be used to govern and/or respond to the behavior of a functional computing object. Functional computing objects include, without limitation, one or more processors, computing devices, virtual machines instantiated on computing devices, virtual hardware (e.g., a virtual processor) modeled by virtual machines, operating systems, software applications, and/or any other elements of a computing device that perform one or more functions, either directly or when executed by another element. Functions performed by functional computing objects may include, for example, retrieving and/or storing data; modifying data; receiving and/or transmitting data; and initiating, interrupting, suspending, or terminating a process.

A rule may define any functional aspect of a functional computing object. In a performance monitoring system, for example, a rule might include a performance metric to be monitored and one or more threshold values associated with the metric. It may also include or reference one or more actions to be taken if an observed value for the metric violates the threshold(s). In one example, a rule defines a threshold memory usage value associated with an alarm action. When a functional computing object, such as a virtual machine, is observed to be using an amount of memory greater than the defined threshold value, the associated alarm action (e.g., an electronic notification) may be performed. In some embodiments, the rule defines a performance metric and a threshold value, and one or more software components define an action to be taken based on the rule. For example, when the performance metric violates the threshold value, a first software component may issue an alarm notification, and a second software component may take a corrective action, such as migrating a virtual machine from one host to another host.

Figure 1:
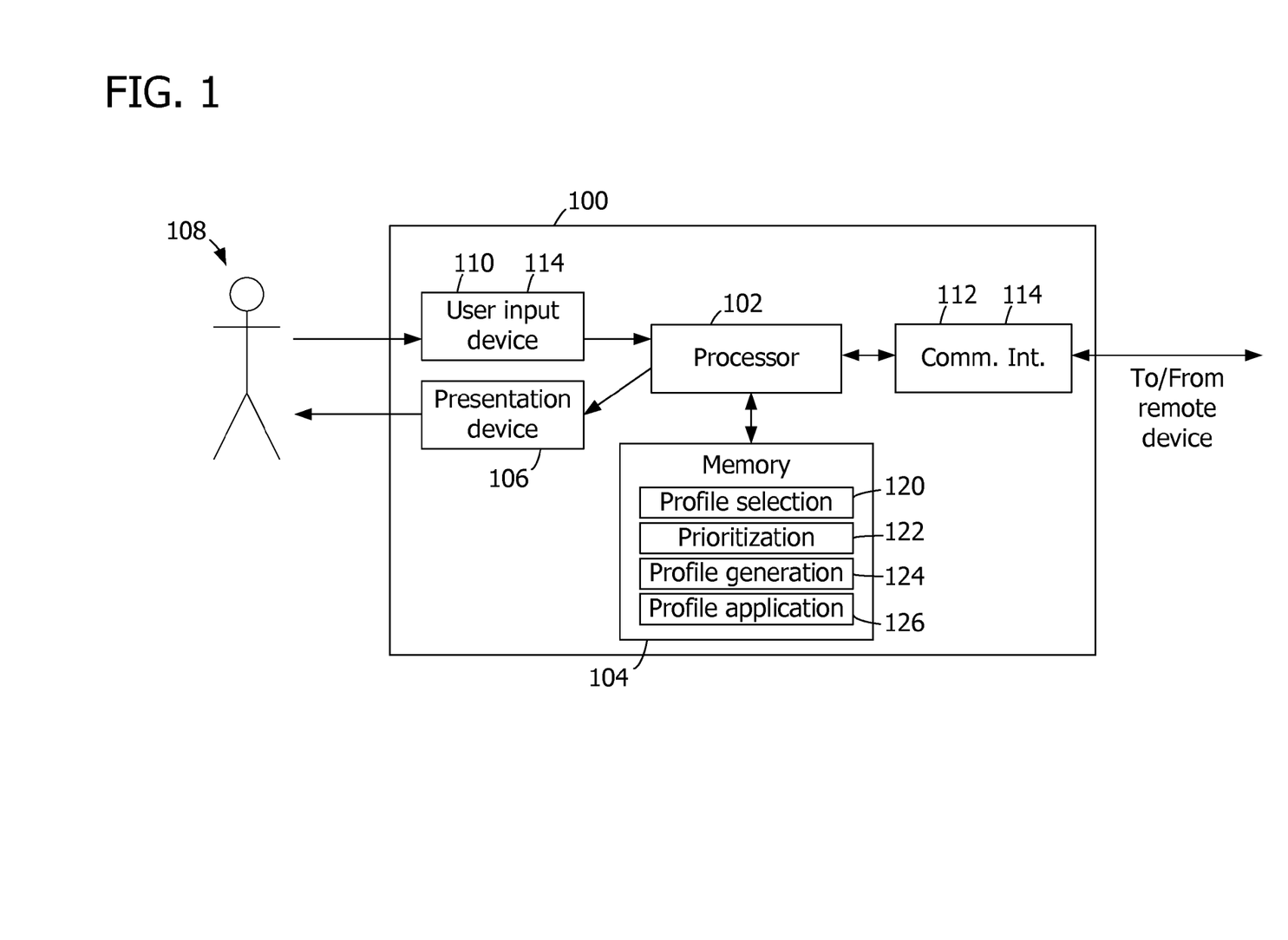
FIG. 1 is a block diagram of an exemplary computing device.

FIG. 1 is a block diagram of an exemplary computing device 100. Computing device 100 includes a processor 102 for executing instructions. In some embodiments, executable instructions are stored in a memory 104. Memory 104 is any device allowing information, such as executable instructions, rules, profiles, profile priorities, and/or other data, to be stored and retrieved.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

In some embodiments, computing device 100 includes a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a communication interface 112, which enables computing device 100 to communicate with a remote device (e.g., another computing device 100) via a communication medium, such as a wired or wireless network. For example, computing device 100 may transmit and/or receive profiles via communication interface 112. User input device 110 and/or communication interface 112 may be referred to as an input interface 114.

In some embodiments, memory 104 stores computer-executable instructions for performing one or more of the operations described herein. Memory 104 may include one or more computer-readable storage media that have computer-executable components embodied thereon. In exemplary embodiments, memory 104 includes a profile selection component 120, a prioritization component 122, a profile generation component 124, and, optionally, a profile application component 126.

When executed by processor 102, profile selection component 120 causes processor 102 processor to identify a plurality of profiles defining one or more rules that are applicable to a functional computing object. Prioritization component 122 causes processor 102 to determine a first priority that corresponds to a first profile of the plurality of profiles and a second priority that corresponds to a second profile of the plurality of profiles. Profile generation component 124 causes processor 102 to combine the first profile and the second profile based on the first priority and the second priority to create an effective profile that includes no conflicting rules. Profile application component 126 causes processor 102 to apply the effective profile to the functional computing object.

Figure 2:
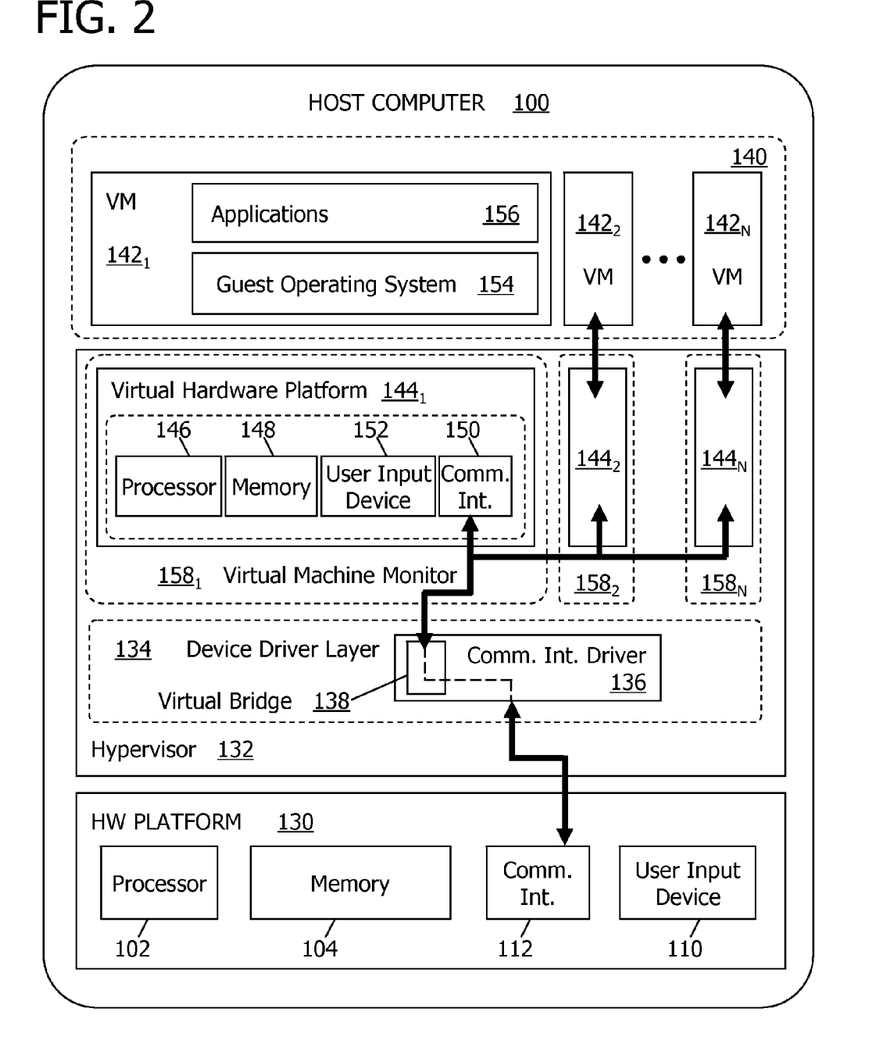
FIG. 2 is a block diagram of virtual machines that are instantiated on a computing device, such as the computing device shown in FIG. 1.

FIG. 2 depicts a block diagram of virtual machines $142_1$, $142_2 \ldots 142_N$ that are instantiated on a computing device 100. Computing device 100 includes a hardware platform 130, such as an x86 architecture platform. Hardware platform 130 may include processor 102, memory 104, communication interface 112, user input device 110, and other input/output (I/O) devices, such as a presentation device 106 (shown in FIG. 1). A virtualization software layer, also referred to hereinafter as a hypervisor 132, is installed on top of hardware platform 130.

The virtualization software layer supports a virtual machine execution space 140 within which multiple virtual machines (VMs $142_1$-$142_N$) may be concurrently instantiated and executed. Hypervisor 132 includes a device driver layer 134, and maps physical resources of hardware platform 130 (e.g., processor 102, memory 104, communication interface 112, and/or user input device 110) to "virtual" resources of each of VMs $142_1$-$142_N$ such that each of VMs $142_1$-$142_N$ has its own virtual hardware platform (e.g., a corresponding one of virtual hardware platforms $144_1$-$144_N$), each virtual hardware platform having its own emulated hardware (such as a processor 146, a memory 148, a communication interface 150, a user input device 152 and other emulated I/O devices in VM $142_1$).

Device driver layer 134 includes, for example, a communication interface driver 136 that interacts with communication interface 112 to receive and transmit data from, for example, a local area network (LAN) connected to computing device 100. Communication interface driver 136 also includes a virtual bridge 138 that simulates the broadcasting of data packets in a physical network received from one communication interface (e.g., communication interface 112) to other communication interfaces (e.g., the virtual communication interfaces of VMs $142_1$-$142_N$). Each virtual communication interface for each VM $142_1$-$142_N$, such as communication interface 150 for VM $142_1$, may be assigned a unique virtual Media Access Control (MAC) address that enables virtual bridge 138 to simulate the forwarding of incoming data packets from communication interface 112. In one embodiment, communication interface 112 is an Ethernet adapter that is configured in "promiscuous mode" such that all Ethernet packets that it receives (rather than just Ethernet packets addressed to its own physical MAC address) are passed to virtual bridge 138, which, in turn, is able to further forward the Ethernet packets to VMs $142_1$-$142_N$. This configuration enables an Ethernet packet that has a virtual MAC address as its destination address to properly reach the VM in computing device 100 with a virtual communication interface that corresponds to such virtual MAC address.

Virtual hardware platform $144_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 154 in order to execute applications 156 for an instantiated VM, such as VM $142_1$. Virtual hardware platforms $144_1$-$144_N$ may be considered to be part of virtual machine monitors (VMM) $158_1$-$158_N$ which implement virtual system support to coordinate operations between hypervisor 132 and corresponding VMs $142_1$-$142_N$. Those with ordinary skill in the art will recognize that the various terms, layers, and categorizations used to describe the virtualization components in FIG. 2 may be referred to differently without departing from their functionality or the spirit or scope of the invention. For example, virtual hardware platforms $144_1$-$144_N$ may also be considered to be separate from VMMs $158_1$-$158_N$, and VMMs $158_1$-$158_N$ may be considered to be separate from hypervisor 132. One example of hypervisor 132 that may be used in an embodiment of the invention is included as a component in VMware's ESX brand product, which is commercially available from VMware, Inc.

Figure 3:
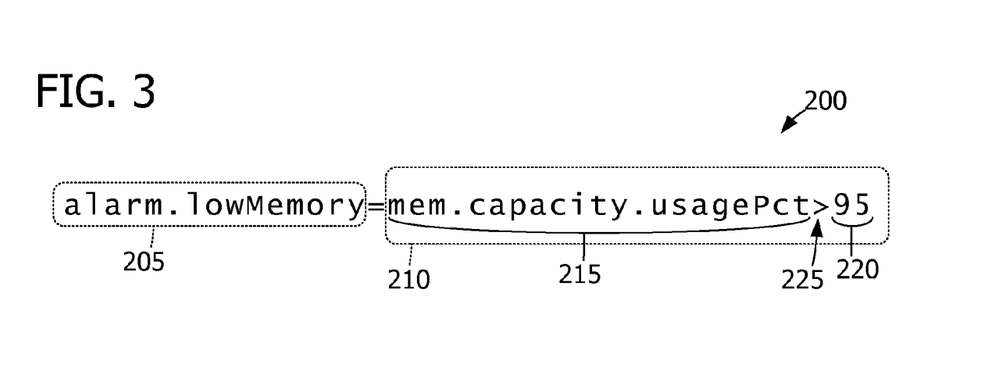
FIG. 3 is an exemplary rule that may be used to specify the conditions under which an action is to be performed.

Functional aspects of functional computing objects, such as computing device 100, VMs $142_1$-$142_N$, and/or any other hardware and/or software, may be defined by one or more rules. FIG. 3 is an exemplary rule 200 that may be used to specify the conditions under which an action is to be performed. Rule 200 is expressed as a key-value pair, with an identifier 205 as the key and a condition 210 as the value. Alternatively, rule 200 may be expressed as structured data, such as Extensible Markup Language (XML), an in-memory data object, a serialized data object, a record in a database, and/or any other form suitable for use with the methods described herein.

In exemplary embodiments, identifier 205 is a reference to an action, such as the activation of an alarm (e.g., a low memory alarm). Alternatively, identifier 205 may be any string, number, or other value that uniquely identifies rule 200. Identifier 205 may be defined by a user 108 or may be automatically assigned by a computing device 100 (both shown in FIG. 1). For example, computing device 100 may assign sequential values as identifiers 205 of a plurality of rules 200.

Condition 210 defines the circumstances under which the action associated with rule 200 is to be performed. In exemplary embodiments, condition 210 defines a comparison of a property 215 of a functional computing object to a value 220 using a comparison operator 225. More specifically, property 215 represents the proportion of available memory in use by a functional computing object, such as a VM, and value 220 is a threshold value, expressed as a percentage of available memory. Comparison operator 225 is a greater-than symbol, indicating that the alarm associated with identifier 205 is to be activated when property 215 (e.g., the proportion of memory in use) exceeds threshold value 220 (e.g., 95%). Other comparison operators include, but are not limited to, a less-than symbol, an equal-to symbol, a greater-than-or-equal-to symbol, a less-than-or-equal-to symbol, and a not-equal-to symbol. Property 215 may be any attribute of a functional computing object, including a health metric or performance metric, such as a network latency, a network throughput, a network connection state, a processor usage, a processor contention, a quantity or rate of data bus resets, and/or a disk access speed. Condition 210 may be a compound condition that includes a plurality of conditions in the disjunctive and/or the conjunctive. For example, a condition 210 may specify that a low battery alarm is to be activated when a battery charge level is below 10% of capacity and the battery is discharging.

Particular examples of conditions 210 involving the comparison of functional computing object properties to predetermined values are described above. Other conditions 210 may include, without limitation, the existence of predetermined data (e.g., a valid software license key), the failure of an operation (e.g., a migration of a VM from one host to another host), the connection or disconnection of an actual or virtual device, and/or any other attribute or event of interest.

In some embodiments, a rule 200 defines a configuration parameter controlling the behavior of a functional computing object with only identifier 205 and value 220. For example, the frequency with which memory usage is compared to a predetermined threshold value may be defined as once every five seconds by a rule such as "alarm.lowMemory.pollingInterval=5".

Figure 4:
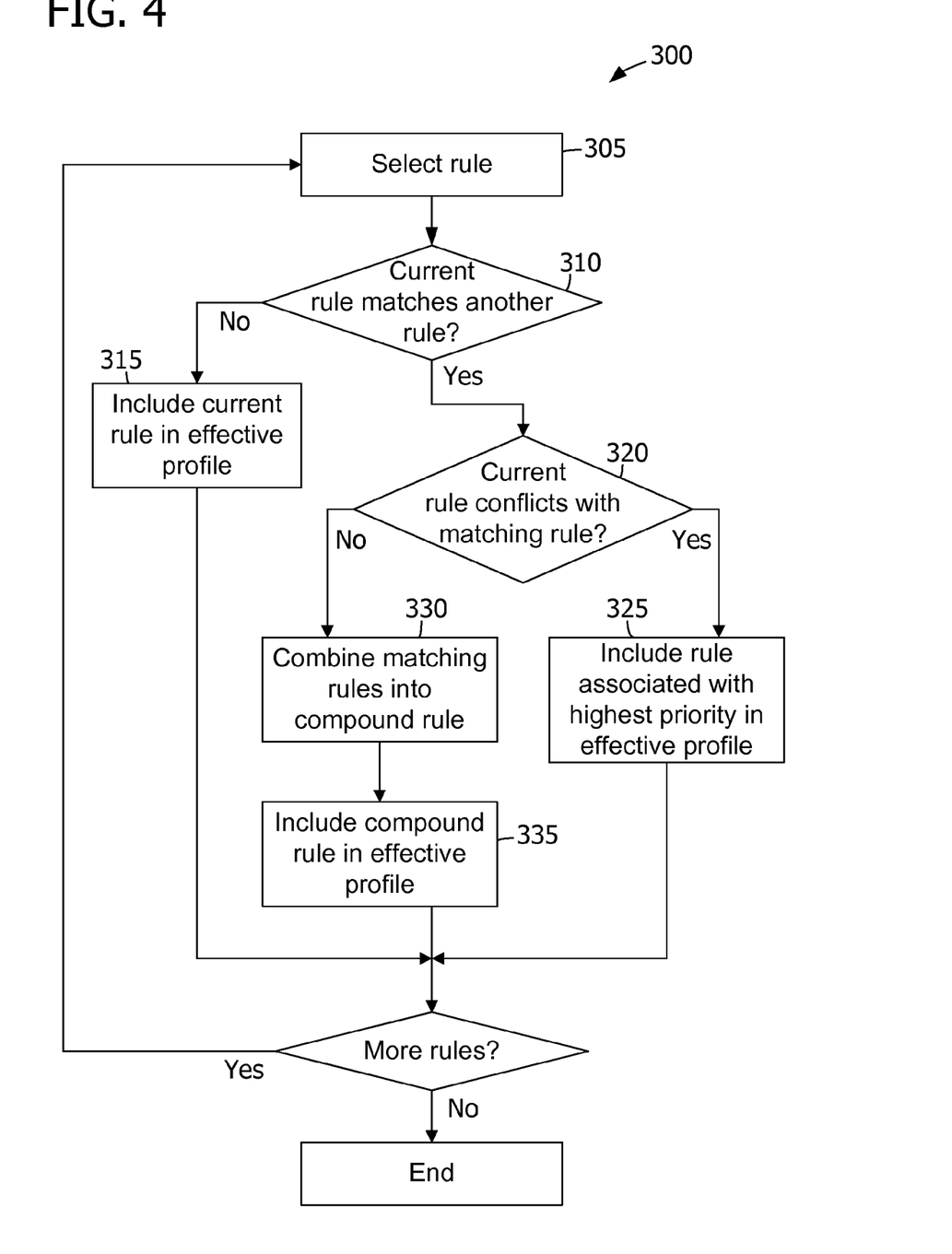
FIG. 4 is a flowchart of an exemplary method for combining a plurality of profiles to create an effective profile.

One or more rules may be included in a profile, and a plurality of profiles may be applied to a functional computing object. FIG. 4 is a flowchart of an exemplary method 300 for combining 425 (shown in FIG. 5) a plurality of profiles, referred to as input profiles, to create an effective profile. The operations included in method 300 may be performed by one or more computing devices 100 (shown in FIG. 1). While one embodiment of method 300 is shown in FIG. 4, it is contemplated that any of the operations illustrated may be omitted and that the operations may be performed in a different order than is shown.

A rule, such as rule 200 (shown in FIG. 3), is selected 305 from one of the input profiles. The selected rule, referred to as the current rule herein, is compared to any rules already defined by the effective profile and/or the rules defined by the other input profiles to determine 310 whether the current rule matches any other rules. In one embodiment, determining 310 whether the current rule matches another rule includes comparing the identifiers 205 (shown in FIG. 3) associated with each of the rules. For example, if the identifiers 205 are equal, the rules may be considered matching rules.

If the current rule does not match any other rules, the current rule is included 315 in the effective profile, and method 300 continues with the selection 305 of another rule from one of the input profiles, if any such rules remain. If the current rule is determined 310 to match one or more other rules, the current rule and any rules determined 310 to match are combined into a set of matching rules. The matching rules are compared to determine 320 whether the current rule conflicts with one or more of the other matching rules. In one embodiment, a conflict between matching rules is determined 320 at least in part by determining whether the matching rules define and/or evaluate the same parameter or property 215 (shown in FIG. 3) of the functional computing object.

If the current rule is determined 320 to conflict with one or more other matching rules, the rule associated with the highest priority among the matching rules is included 325 in the effective profile, and all other matching rules are excluded. In some embodiments, the priority associated with each rule is equal to the priority associated with the input profile that defines the rule. Alternatively, or in addition, the priority may be based on a priority assignment that has been received 410 (shown in FIG. 5) for the individual rule and/or may be based on the time at which the rule was created or modified, with greater priorities being associated with more recently created or modified rules. After including 325 the highest-priority rule, method 300 continues with the selection 305 of another rule from one of the input profiles, if any such rules remain.

If the current rule does not conflict with any other matching rules, the matching rules are combined 330 into a compound rule, and the compound rule is included 335 in the effective profile. For example, if the matching rules each include a condition 210 (shown in FIG. 3) associated with the same identifier 205, the matching rules may be combined 330 by creating a compound condition that includes the condition 210 from each matching rule and associating the compound condition with the identifier 205. Further, even if the current rule is determined 320 to conflict with one matching rule, the current rule may be combined 330 with any non-conflicting matching rules to create a compound rule. In one embodiment, the compound condition includes the condition from each matching rule in the disjunctive (e.g., in an "or" relationship). Method 300 continues with the selection 305 of another rule from one of the input profiles, if any such rules remain.

In exemplary embodiments, when method 300 has been executed for all rules defined by the input profiles, the combination 425 of input profiles into an effective profile is complete, and the effective profile includes no conflicting rules. Further, any conflicts between rules in the input profiles have been resolved based on the priority associated with each input profile. For example, if two profiles define rules with different conditions associated with the same action (e.g., an alarm activation), the effective profile may include the rule defined by the profile associated with the higher priority, and the other rule may be excluded from the effective profile. Accordingly, the higher-priority profile may be understood to override the lower-priority profile.

Figure 5:
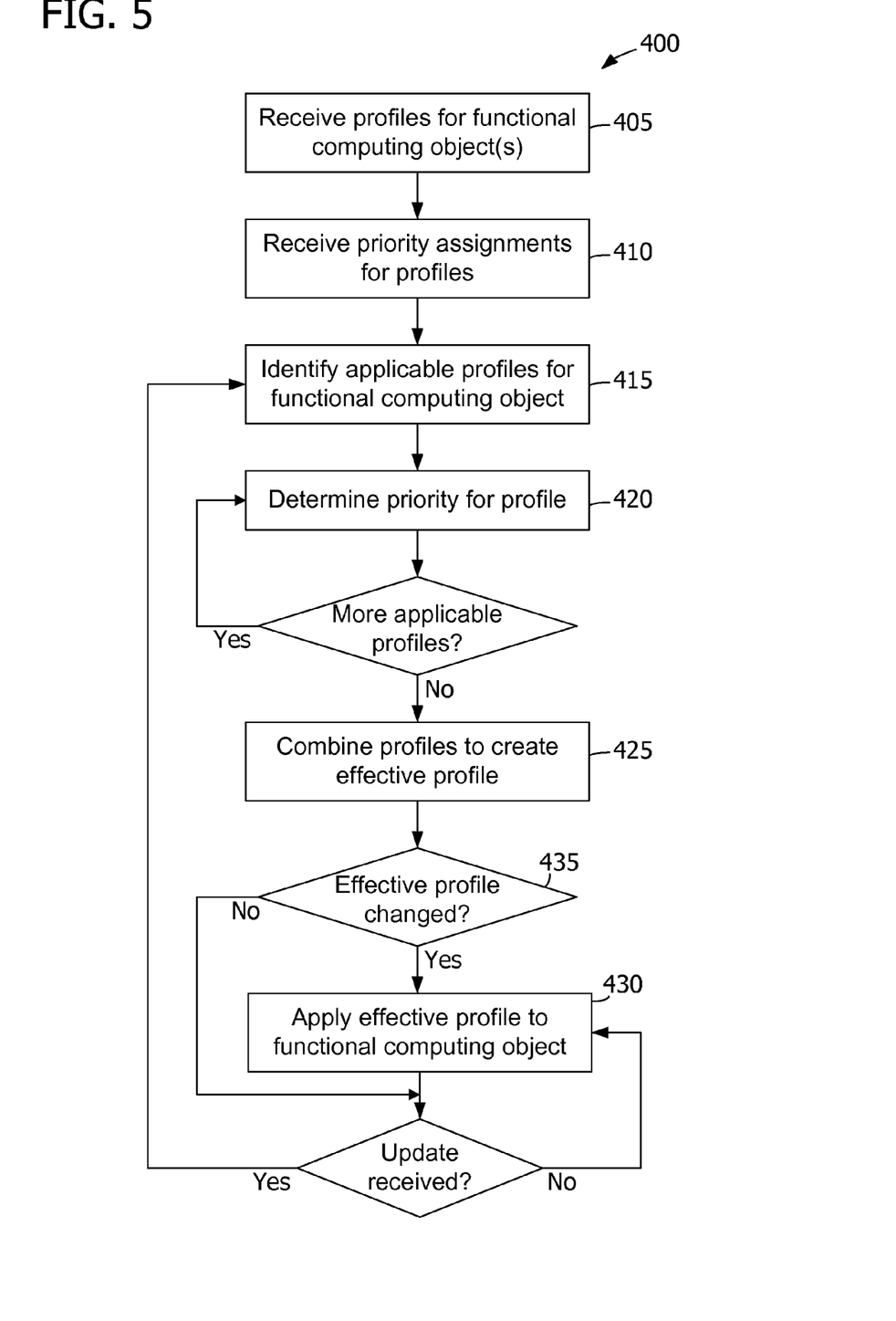
FIG. 5 is a flowchart of an exemplary method for creating an effective profile and applying the effective profile to a functional computing object.

In one embodiment, a first functional computing object and a second functional computing object are associated with a first profile and a second profile. An assignment of a high priority is received 410 for the first profile with respect to the first functional computing object. An assignment of a high priority is also received 410 for the second profile with respect to the second functional computing object. Accordingly, any conflicts between the first profile and the second profile are resolved in favor of the first profile with respect to the first functional computing object and in favor of the second profile with respect to the second functional computing object.

Method 300 may be used to generate an effective profile from a plurality of profiles that are determined to be applicable to a functional computing object. FIG. 5 is a flowchart of an exemplary method 400 for creating an effective profile and applying the effective profile to a functional computing object. The operations included in method 400 may be performed by one or more computing devices 100 (shown in FIG. 1). While one embodiment of method 400 is shown in FIG. 5, it is contemplated that any of the operations illustrated may be omitted and that the operations may be performed in a different order than is shown.

In exemplary embodiments, method 400 includes receiving 405 profiles that are applicable to one or more functional computing objects. Each profile defines one or more rules, and each rule defines a behavioral aspect of a functional computing object or group of functional computing objects. For example, a rule may specify an alarm threshold value, a polling interval, or an outgoing message destination. Referring to FIGS. 1 and 5, profiles may be received 405 by an input interface 114, such as a user input device 110 or communication interface 112, of a computing device 100.

In some embodiments, a profile is received 405 for a plurality of functional computing objects. For example, a user may select a plurality of functional computing objects to which the profile is applicable, and a collection of identifiers referring to these functional computing objects may be received 405 with the profile.

Figure 6:
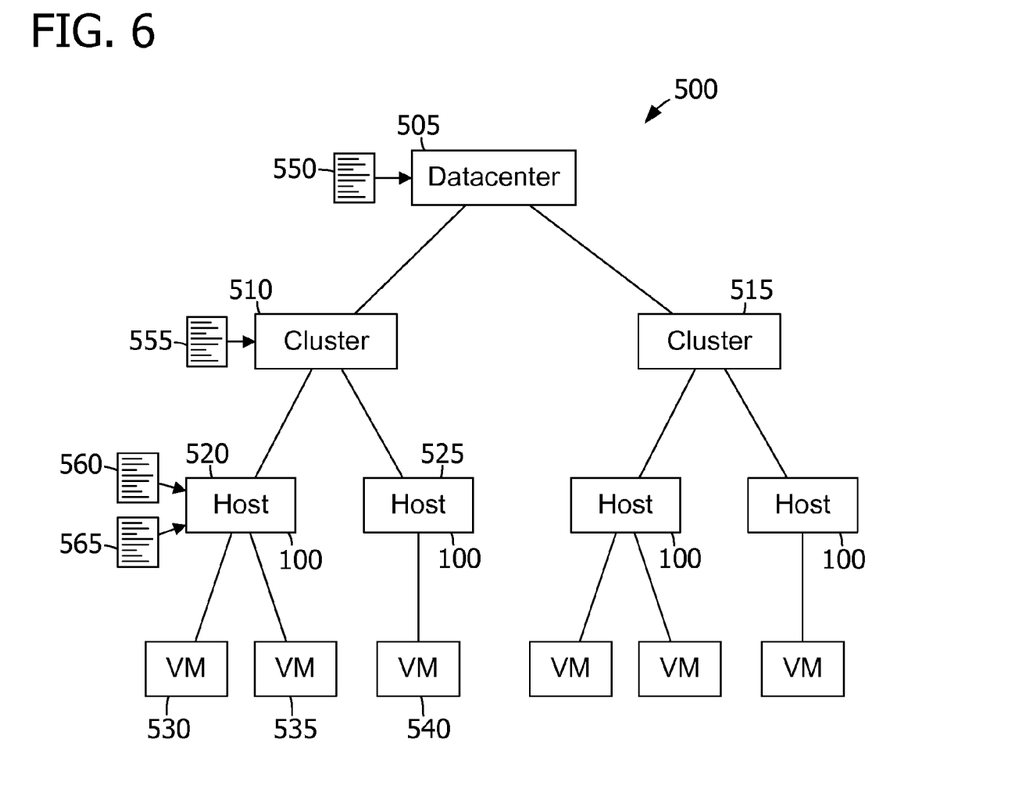
FIG. 6 is a block diagram of an exemplary hierarchy of functional computing objects.

Profiles may be applied to a functional computing object based on the position of the functional computing object in a hierarchy of functional computing objects. FIG. 6 is a block diagram of an exemplary hierarchy 500 of functional computing objects. In exemplary embodiments, the functional computing object at the top of hierarchy 500 is a datacenter 505. Datacenter 505 includes a first cluster 510 and a second cluster 515 of computing devices 100 (shown in FIG. 1), which may be referred to as "hosts." First cluster 510 includes a first host 520 and a second host 525. Instantiated on and/or executed by first host 520 are a first virtual machine (VM) 530 and a second VM 535. A third VM 540 is instantiated on second host 525. Hierarchy 500 may be defined prior to execution of method 400 and may therefore be referred to as a predetermined hierarchy.

Referring to FIGS. 5 and 6, a first profile 550 associated with datacenter 505 and a second profile 555 associated with first cluster 510 are received 405. A third profile 560 and fourth profile 565, both associated with first host 520, are also received 405. Optionally, a priority assignment may be received 410 for one or more of the profiles. A priority may be assigned to a profile and/or to a combination of a profile and one or more functional computing objects. In one example, when multiple profiles (e.g., third profile 560 and fourth profile 565) are directly associated with one functional computing object (e.g., first host 520), a user 108 (shown in FIG. 1) may be required to assign different priorities to the profiles. In some embodiments, a priority assignment may be received 410 for a portion of a profile, such as one or more rules within the profile. Priorities may be expressed numerically (e.g., with the number one representing a highest priority), textually (e.g., with the string "Highest" representing a highest priority), as an ordering of profiles (e.g., third profile 560 followed by fourth profile 565), and/or in any other form suitable for indicating the relative priorities of profiles. Profiles and/or priorities may be stored in memory 104 of computing device 100 (shown in FIG. 1).

A plurality of profiles that are applicable to a functional computing object are identified 415. In one embodiment, identifying 415 profiles that are applicable to first host 520 includes determining which profiles are directly associated with first host 520. For example, the association of third profile 560 and fourth profile 565 with first host 520 may be retrieved from memory 104. In such an embodiment, only third profile 560 and fourth profile 565 are applicable to first host 520.

In addition, or alternatively, in some embodiments, identifying 415 profiles that are applicable to first host 520 includes determining that one or more functional computing objects (e.g., datacenter 505 and first cluster 510) are positioned above first host 520 in hierarchy 500, and determining that one or more profiles (e.g., first profile 550 and second profile 555, respectively) are associated with these functional computing objects. In such an embodiment, a "child" functional computing object (e.g., first host 520) may be understood to "inherit" profiles that are associated with "parent" functional computing objects in hierarchy 500.

Accordingly, in such an embodiment, first profile 550, second profile 555, third profile 560, and fourth profile 565 are identified 415 as applicable to first host 520. Similarly, first profile 550, second profile 555, third profile 560, and fourth profile 565 are identified 415 as applicable to first VM 530 and second VM 535. In contrast, because third profile 560 and fourth profile 565 are not associated with a functional computing object above second host 525 in hierarchy 500, only first profile 550 and second profile 555 are identified 415 as applicable to second host 525 and, likewise, third VM 540.

A priority is determined 420 for each profile that is applicable to the functional computing object. In exemplary embodiments, a unique priority is determined 420 for each applicable profile, such that no two applicable profiles are associated with the same priority. If a priority assignment has been received 410 for a profile, the priority is determined 420 based at least in part on the priority assignment. For example, if only third profile 560 and fourth profile 565 are applicable to first host 520, the priorities of third profile 560 and fourth profile 565 may be equal to the corresponding assigned priorities.

In some embodiments, the priority is determined 420 for a profile based at least in part on the time at which the profile was created, modified, or associated with (e.g., received 405 for) a functional computing object. For example, given a plurality of profiles, priorities may be determined 420 by associating a highest priority with the most recently created, updated, or associated profile and associating a lowest priority with the least recently created, updated, or associated profile.

In an embodiment in which profiles are inherited, the priority of an inherited profile with respect to a child functional computing object may be determined 420 based at least in part on the distance of the associated parent functional computing object to the child functional computing object within hierarchy 500. The distance may be expressed as the quantity of levels separating the parent functional computing object from the child functional computing object. For example, first host 520 is separated from first cluster 510 by one level and separated from datacenter 505 by two levels. A functional computing object may be considered to be separated from itself by zero levels.

In some embodiments, a functional computing object is associated with a plurality of hierarchies. For example, first VM 530 and second VM 535 may be included in a first hierarchy (e.g., hierarchy 500) that represents information about hardware objects, such as a cluster in which first host 520 resides (e.g., first cluster 510), a datacenter in which first host 520 resides (e.g., datacenter 505), a geographic location of first host 520, and/or a network to which first host 520 is connected. First VM 530 and second VM 535 may also be included in a second hierarchy that represents information about software objects, such as a functional group to which first VM 530 and second VM 535 belong, a resource pool to which first VM 530 and second VM 535 belong, and/or a VM directory or folder in which first VM 530 and second VM 535 reside.

In such embodiments, profiles may be associated with any functional computing objects in any of the hierarchies in which the functional computing object is included, and priorities are determined 420 for. Priority assignments are received 410 for one or more of these hierarchies, and identifying 415 profiles that are applicable to a functional computing object includes selecting any functional computing objects that are positioned above the functional computing object in either hierarchy. Priorities are determined 420 for profiles based on the priorities assigned to the corresponding hierarchies. In one embodiment, all profiles within a higher-priority hierarchy are determined 420 to have a priority that is higher than the priority determined 420 for any profile within a lower-priority hierarchy. In another embodiment, the priorities associated with the hierarchies are used when a child functional computing object is equidistant from an inherited profile in two or more hierarchies, with the inherited profile from the higher-priority hierarchy being determined 420 to have a priority that is higher than the priority determined 420 for the inherited profiles from any lower-priority hierarchies.

In exemplary embodiments, for each applicable profile, the distance between the associated functional computing object and the functional computing object in question is determined, and the priority of the profile varies inversely with the distance. Accordingly, each applicable profile is associated with a distance, and the priority corresponding to each profile may be determined 420 to be greater than the priority corresponding to any profile that is associated with a greater distance. For example, with respect to first host 520, third profile 560 may be assigned a priority that is less than the priority assigned to fourth profile 565. However, third profile 560 is associated with a distance that is smaller than the distances associated with first profile 550 and second profile 555. Accordingly, third profile 560 may be determined 420 to have a corresponding priority that is greater than the priority corresponding to first profile 550 and second profile 555, regardless of any priority assigned to first profile 550 and second profile 555.

The applicable profiles are combined 425 to create an effective profile for the functional computing object. In some cases, the applicable profiles define one or more conflicting rules. Accordingly, the profiles may be combined 425 based on the corresponding priorities, as described in more detail with reference to method 300 (shown in FIG. 4), such that the effective profile includes no conflicting rules.

The effective profile is applied 430 to the functional computing object. In exemplary embodiments, the effective profile includes one or more rules that specify a condition associated with an action, and applying 430 the effective profile includes performing such an action when the associated condition is satisfied. In some embodiments, the effective profile is applied 430 by terminating and restarting operation of the functional computing object. In other embodiments, the effective profile is applied 430 while the functional computing object is operating (e.g., by notifying the functional computing object of the effective profile).

Referring to FIGS. 3 and 5, rule 200 is applied 430 to a functional computing object by evaluating condition 210 while the functional computing object is operating. The evaluation may be performed by the functional computing object itself and/or by a software application, such as a monitoring utility, that has access to the functional computing object. In some embodiments, condition 210 is repeatedly (e.g., periodically and/or continuously) evaluated.

Referring to FIG. 5, in some embodiments, an effective profile is applied 430 to a functional computing object until an update to a profile and/or an update to the priority of a profile is received. For example, an update may be received via an input interface 114, such as user input device 110 or communication interface 112 (all shown in FIG. 1).

An update to a profile may include, for example, the modification, addition, or deletion of a rule. An update to a priority may include the modification of a priority assignment, the modification of a hierarchy of functional computing objects, and/or the modification of an association between a profile and a functional computing object.

When such an update is received, an updated effective profile is created for a functional computing object by again identifying 415 applicable profiles, determining 420 a priority for each applicable profile, and combining 425 the profiles based on the determined priorities. Accordingly, an update to any profile that is applicable to a functional computing object may be automatically applied to the functional computing object by regenerating the effective profile. For example, referring to FIGS. 5 and 6, if an update to third profile 560 is received, fourth profile 565 may be combined 425 with updated third profile 560 to create an updated effective profile for first host 520. In an embodiment in which profiles are inherited from parent functional computing objects, if an update to second profile 555 is received, updated effective profiles may be created for first host 520, second host 525, first VM 530, second VM 535, and third VM 540.

The updated effective profile may then be applied 430 to the functional computing object until another update is received. In some embodiments, the updated effective profile is compared to the previously created effective profile to determine 435 whether the effective profile has changed as a result of the update. For example, if an update to second profile 555 modifies a rule that is overridden by third profile 560, the update will not change the effective profile of first host 520, first VM 530, or second VM 535. Accordingly, the previously created effective profiles may be applied 430 to first host 520, first VM 530, and second VM 535 until another update is received. In contrast, the update to second profile 555 will change the effective profiles for second host 525 and third VM 540, so these effective profiles may be regenerated and applied 430.

Exemplary Operating Environment

The combination and application of profiles to functional computing objects as described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for combining profiles based on corresponding priorities.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
    a memory storing a plurality of profiles defining one or more rules that affect operation of a plurality of functional computing objects, the plurality of profiles including a first profile that defines a first rule and a second profile that defines a second rule; and
    a processor coupled to the memory and programmed to:
        determine that the second rule conflicts with the first rule;
        determine a first priority corresponding to the first profile based on a distance of the first functional computing object to another functional computing object that is positioned below the first functional computing object in a predetermined hierarchy;
        combine the first profile and the second profile to create an effective profile, wherein the conflict between the first profile and the second profile is resolved in favor of the first profile with respect to a first functional computing object and in favor of the second profile with respect to a second functional computing object, and wherein the effective profile includes no conflicting rules; and
        apply the effective profile to one of the first and second functional computer objects.

2. The system of claim 1, wherein a high priority is assigned for the first profile with respect to the first functional computing object and a high priority is assigned for the second profile with respect to the second functional computing object.

3. The system of claim 1, wherein the processor is programmed to determine that the second rule conflicts with the first rule further by determining that the first rule and the second rule evaluate the same property of the first and second functional computing objects.

4. The system of claim 1, wherein the processor is programmed to combine the first profile and the second profile at least in part by including the first rule in the effective profile and excluding the second rule from the effective profile with respect to the first functional computing object.

5. The system of claim 4, wherein the processor is programmed to combine the first profile and the second profile at least in part by including the second rule in the effective profile and excluding the first rule from the effective profile with respect to the second functional computing object.

6. The system of claim 1, wherein the processor is programmed to determine that the second rule conflicts with the first rule at least in part by determining that a first identifier associated with the first rule is equal to a second identifier associated with the second rule, and wherein the first identifier associated with the first rule comprises an action corresponding to the first rule or a value that uniquely identifies the first rule.

7. The system of claim 1, wherein the processor is programmed to determine a second priority corresponding to the second profile to be greater than a first priority corresponding to the first profile based on associations of the first and second profiles with the first and second functional computing objects.

8. The system of claim 1, wherein the processor is programmed to determine that the second rule conflicts with the first rule at least in part by determining that a first identifier associated with the first rule is equal to a second identifier associated with the second rule.

9. A method comprising:
    identifying by a computing device a plurality of profiles, wherein each profile of the plurality of profiles defines one or more rules that are applicable to a functional computing object, the plurality of profiles including a first profile that defines a first rule and a second profile that defines a second rule;
    determining that the second rule conflicts with the first rule;
    determining a first priority corresponding to the first profile based on a distance of the first functional computing object to another functional computing object that is positioned below the first functional computing object in a predetermined hierarchy;
    combining the first profile and the second profile by the computing device to create an effective profile, including resolving the conflict between the first profile and the second profile in favor of the first profile with respect to a first functional computing object and in favor of the second profile with respect to a second functional computing object, wherein the effective profile includes no conflicting rules; and applying by the computing device the effective profile to one of the first and second functional computing objects.

10. The method of claim 9, further comprising receiving an assignment of a high priority for the first profile with respect to the first functional computing object and an assignment of a high priority for the second profile with respect to the second functional computing object.

11. The method of claim 9, wherein determining that the second rule conflicts with the first rule includes determining that the first rule and the second rule evaluate the same property of the first and second functional computing objects.

12. The method of claim 9, wherein combining the first profile and the second profile includes including the first rule in the effective profile and excluding the second rule from the effective profile with respect to the first functional computing object.

13. The method of claim 9, wherein combining the first profile and the second profile includes including the second rule in the effective profile and excluding the first rule from the effective profile with respect to the second functional computing object.

14. The method of claim 9, wherein applying the effective profile comprises activating an alarm when a condition included in a rule defined by the first profile is satisfied.

15. The method of claim 9, wherein applying the effective profile comprises applying the effective profile to a virtual machine instantiated on a host computing device.

16. One or more non-transitory computer-readable storage media having computer-executable components comprising:
a profile selection component that when executed by at least one processor causes the processor to identify a plurality of profiles defining one or more rules that are applicable to a functional computing object, the plurality of profiles including a first profile that defines a first rule and a second profile that defines a second rule; and
a profile generation component that when executed by at least one processor causes the processor to determine that the second rule conflicts with the first rule, determine a first priority corresponding to the first profile based on a distance of the first functional computing object to another functional computing object that is positioned below the first functional computing object in a predetermined hierarchy and combine the first profile and the second profile to create an effective profile, wherein the conflict between the first profile and the second profile is resolved in favor of the first profile with respect to a first functional computing object and in favor of the second profile with respect to a second functional computing object, wherein the effective profile includes no conflicting rules.

17. The non-transitory computer readable storage media of claim 16, wherein a high priority is assigned for the first profile with respect to the first functional computing object and a high priority is assigned for the second profile with respect to the second functional computing object.

18. The non-transitory computer readable storage media of claim 16, wherein the profile generation component further causes the processor to:
determine that the second rule conflicts with the first rule further by determining that the first rule and the second rule evaluate the same property of the first and second functional computing objects.

19. The non-transitory computer readable storage media of claim 16, wherein the profile generation component further causes the processor to:
include the first rule in the effective profile and excluding the second rule from the effective profile with respect to the first functional computing object.

20. The non-transitory computer readable storage media of claim 19, wherein the profile generation component further causes the processor to:
include the second rule in the effective profile and excluding the first rule from the effective profile with respect to the second functional computing object.

* * * * *